June 24, 1930.  E. C. WENTE  1,766,473
ELECTRODYNAMIC DEVICE
Filed May 5, 1928   2 Sheets-Sheet 1
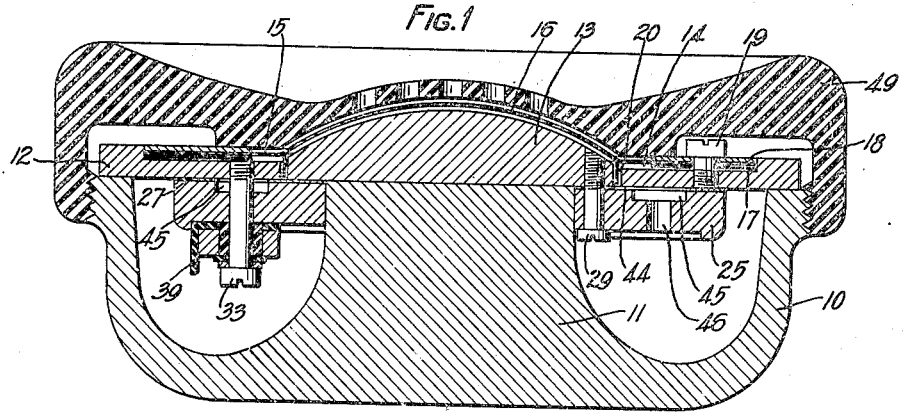
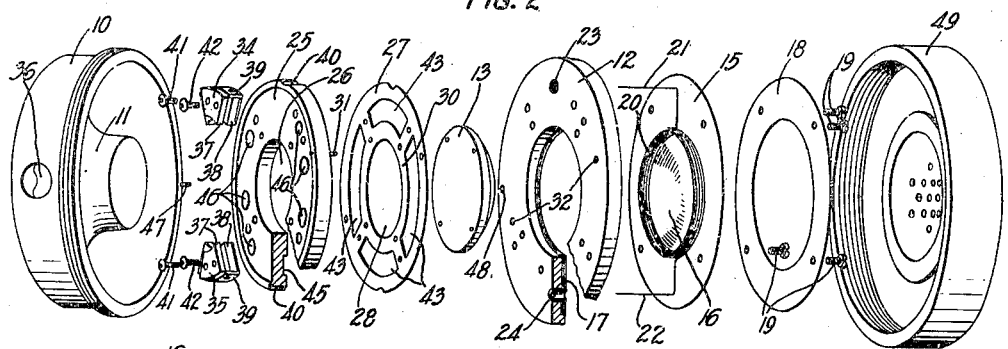
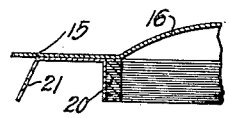
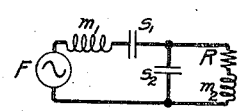
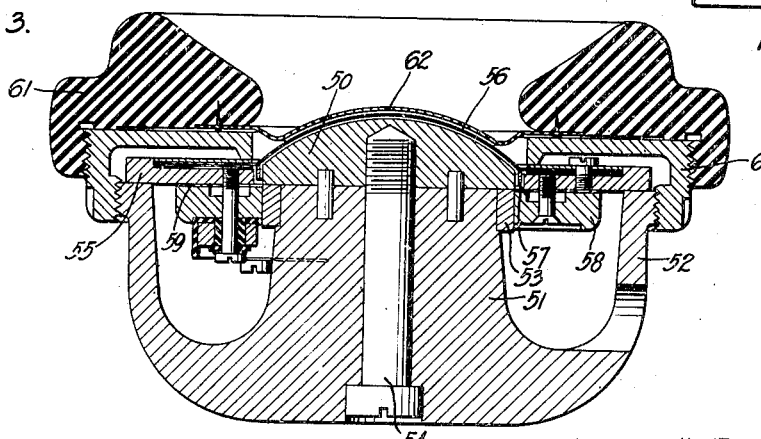
INVENTOR
EDWARD C. WENTE
BY
Walter C. Kiesel
ATTORNEY June 24, 1930.  E. C. WENTE  1,766,473
ELECTRODYNAMIC DEVICE
Filed May 5, 1928   2 Sheets-Sheet 2

INVENTOR
EDWARD C. WENTE
BY
Walter C. Kiesel
ATTORNEY

Patented June 24, 1930

1,766,473

UNITED STATES PATENT OFFICE

EDWARD C. WENTE, OF NEW YORK, N. Y., ASSIGNOR TO BELL TELEPHONE LABORATORIES, INCORPORATED, OF NEW YORK, N. Y., A CORPORATION OF NEW YORK

ELECTRODYNAMIC DEVICE

Application filed May 5, 1928. Serial No. 275,542.

This invention relates to electrodynamic devices and particularly to such devices for use in receiving and transmitting sound.

An object of the invention is to receive and transmit sound with high and substantially uniform efficiency over a wide frequency range.

Another object of the invention is to improve the quality and transmission characteristic of telephone receivers and transmitters.

In accordance with one embodiment of the invention an electrodynamic type receiver or transmitter comprises a piston type diaphragm having a coil attached thereto which is movable in a magnetic field. The diaphragm is controlled in its movement by providing a chamber under the diaphragm and utilizing the mass, elasticity and viscosity of air introduced into the chamber to efficiently damp the mechanical motion of the diaphragm. The chamber under the diaphragm is substantially enclosed by a ring member or damping plate having narrow passageways which lead to the hollow casing of the magnetic structure. The area of the chamber formed under the diaphragm is so proportioned as to obtain the proper acoustic impedance of the air in the chamber which when associated with the impedance of the diaphragm produces a resultant impedance which is inversely proportional with frequency. This results in the response characteristic of the device being substantially a straight line over a range of frequencies from approximately 60 cycles to 10,000 cycles.

The proportioning of the effective area of the chamber under the diaphragm may, in accordance with this invention, be applied to transmitters to secure equal compression or air chamber stiffness on the inside and outside of the movable coil attached to the diaphragm. This is accomplished by increasing the radial distance between the clamping ring and the movable coil on the diaphragm and decreasing the size of the chamber outside the movable coil to prevent distortion due to a bucking action of the air in the damping chamber within the coil and outside of the coil.

Another feature of the invention relates to the magnetization of the magnetic structure after the unit is completely assembled, to attain a high degree of magnetism in the structure. This procedure results in the two major parts of the unit being held rigidly in position by the cohesive force of the magnetism in the magnetic structure.

These and other features of the invention will be more fully understood from the following detailed description in connection with the accompanying drawings.

Fig. 1 illustrates in cross-section an enlarged view of one form of the invention applied to an electrodynamic receiver;

Fig. 2 is a perspective view of the detailed parts of the receiver of Fig. 1 in their relative positions before assembly;

Fig. 3 is an enlarged sectional view of a portion of the diaphragm and coil made in accordance with this invention;

Fig. 4 shows diagrammatically an electrical transmission circuit which is equivalent to the mechanical system of the eletrodynamic device made in accordance with this invention;

Fig. 5 shows in cross-section another form of the invention;

Figure 6:
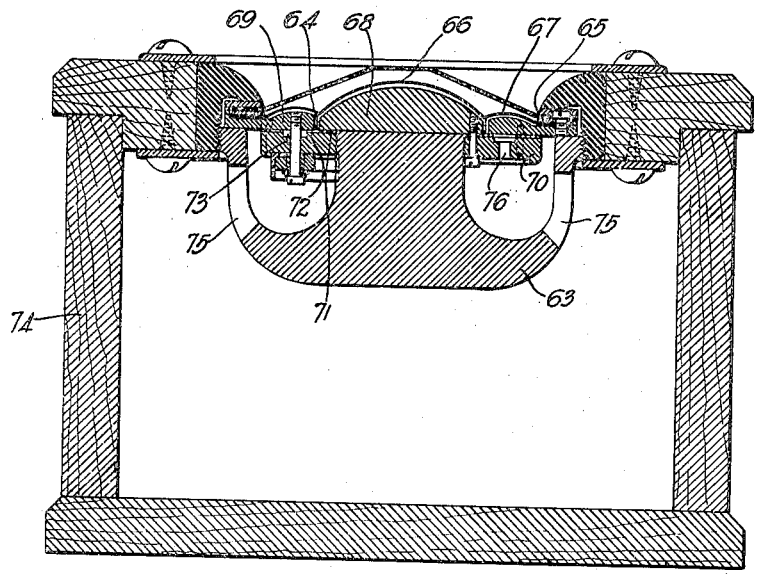
Fig. 6 illustrates in cross-section the features of this invention applied to an electrodynamic transmitter.

Referring now to Figs. 1 and 2 an electrodynamic type receiver is shown comprising a mushroom-shaped casing, preferably of cobalt steel having a magnet shell 10 and an integral central pole piece 11, the rim of the shell 10 being in the same plane as the surface of the central pole 11. A diaphragm assembly fits over the open end of the casing and comprises an outer annular pole piece 12, preferably of magnetic iron, which constitutes one pole of the device, a central dome-shaped pole piece 13 of similar material which fits within the pole piece 12 and is spaced therefrom to form an annular gap. The pole piece 12 is provided with a circular recess 14 on one surface to form a seat for the circular diaphragm 15 of light mass, preferably of duralumin or other aluminum alloy. The diaphragm is formed with a central dome-shaped portion 16 corresponding in curvature to the dome-shaped pole piece 13. The dome-shaped portion 16 of the diaphragm adds stiffness to the diaphragm so that this portion vibrates as a piston. This piston portion of the diaphragm is equally spaced from the surface of the pole piece 13 over the whole area thereof by a plurality of paper washers 17 placed between the outer portion of the diaphragm 15 and the surface of the pole piece 12 in the recessed portion 14. This spacing forms a thin air chamber under the diaphragm surface and will be referred to later more in detail. A metal ring 18 engages the outer surface of the diaphragm and forms a clamping ring for the diaphragm when the screws 19 are fastened through holes in the ring 18, diaphragm 15, washers 17 and pole piece 12. An annular movable coil 20 is attached to the edge of the piston portion 16 of the diaphragm and comprises a plurality of turns of ribbon conductor, preferably of copper or aluminum, wound edgewise with adjacent turns insulated from each other by a coating of insulating varnish. The coil is attached directly to the surface of the diaphragm as shown more clearly in Fig. 3 by coating the rim of the coil adjacent the diaphragm with insulating varnish and pressing the coil against the diaphragm surface until the varnish is hardened. The connection of the coil to the diaphragm in this manner insures uniform contact of the coil with the piston portion of the diaphragm over the whole periphery so that the coil and piston portion of the diaphragm move as a unit and no distortion occurs. The ends 21 and 22 of the coil 20 are brought out in any suitable manner to the insulating bushings 23 and 24 located in the pole piece 12.

The outer pole piece 12 and inner pole piece 13 are maintained in equal spaced relation by the annular plate member 25, of non-magnetic material, such as aluminum or brass, to form a small annular gap concentric with the poles of the diaphragm assembly. The plate member 25 is provided with an aperture 26, the diameter of which is the same as the diameter of the central integral pole 11 of the casing. This arrangement forms an efficient centering and guiding means for the diaphragm assembly on the magnetic shell casing and insures accurate face to face contact of the pole piece 12 with the rim of the casing 10 and the central pole piece 13 with the central pole 11 of the casing. The assembly of the diaphragm may be accomplished by placing the thin metallic skeleton spacing ring 27, which is preferably of phosphor bronze, in contact with the non-magnetic plate member 25 with the central aperture 28 in register with the aperture 26 of the plate member 25. The dome-shaped pole piece 13 is attached to the plate member 25 by screws such as 29 shown in Fig. 1 and rigidly fastens the inner ring portion 30 of the spacing ring 27 between the member 25 and the pole piece 13. The pole piece 12 with the diaphragm affixed thereto is attached to the plate member 25 by bringing the guide pins on the plate member 25, one of which is shown at 31, in register with the holes 32 in the pole piece 12 and rigidly fastening the members together by screws. The non-magnetic plate member 25 also carries the segmental terminal posts 34 and 35 on the rear thereof which serve as connections for the ends of the movable coil 20 and to which external connections may be made by a conductor cord entering the casing through the aperture 36. The terminal posts consist of segmental plates 37 and 38 insulated from the plate 25 by a segmental insulator 39 and attached to plates 25 and 12 by the screw 33 as shown in Fig. 1. The ends 21 and 22 of the coil 20 extending through the bushings in the pole piece 12 fit into the groove 40 which is in alignment with the bushings 23 and 24 in the pole piece 12 and are bent inwardly to pass through a hole in the segmental insulator 39 and are clamped between the terminal plates 37 and 38 by the screws 41 and 42. The diaphragm assembly may be attached to the casing by registering the pin 47 on the rim of the shell 10 with the hole 48 in the pole piece 12 and guiding the aperture 26 in the non-magnetic plate 25 over the central pole 11 of the casing. A receiver cap 49 protects the diaphragm and is threaded to the casing.

In an electrodynamic device of the movable coil type and having a diaphragm of such mass and stiffness as to operate as a piston when vibrating, the mechanical movement of the diaphragm and coil causes distortion over a certain portion of the speech frequency range, due to the natural frequency of the diaphragm being within this portion of the frequency range. In accordance with this invention the mechanical motion of the diaphragm is damped by utilizing the mass, elasticity and viscosity of the air on one side of the diaphragm by means of a chamber and restricted passageway on that side of the diaphragm, to control the mechanical motion of the diaphragm and thereby reduce the distortion of the moving system over the portion of the frequency range at which the diaphragm is normally resonant. This is accomplished in the construction shown in Figs. 1 and 2 by the non-magnetic damping plate 25 which substantially encloses the chamber formed between the diaphragm and the pole pieces 12 and 13 and the annular gap between the pole pieces. This chamber will then give an additional stiffness to the diaphragm and therefore raise the frequency of the diaphragm to a higher value. However, this additional stiffness also lowers the amplitude or response of the diaphragm and therefore reduces the efficiency and quality of the moving system. Now if this chamber is connected by a restricted passageway or opening into the hollow portion of the casing 10, then the amplitude of the driving system will be returned to its former value and the frequency curve will be uniform over a greater frequency range. The restricted air passageway is formed in the structure shown by the cut-out portions 43 of the spacing ring 27 and the spaced adjacent surfaces of the pole piece 12 and the damping member 25 as shown by the radial slit at 44 in Fig. 1. The radial slit 44 forms the communicating passageway between the chamber under the diaphragm and a circular groove 45 in the damping plate 25. The groove 45 is provided with a plurality of equally spaced holes 46 drilled through the plate 25 at right angles to the groove 45. This arrangement forms an efficient means of utilizing the mass, stiffness and viscosity of the air to control the mechanical motion of the diaphragm. When the diaphragm portion 16 moves away from the pole piece 13 sufficient air is drawn into the chamber under the diaphragm through the holes 46, groove 45 and radial slit 44 equal to the displacement of the diaphragm and when the diaphragm moves toward the central pole piece the air in the chamber is forced out trough the same restricted passageway which acts as an acoustic resistance to control the mechanical motion of the diaphragm.

This operation may be more fully understood by referring to the electrical circuit shown in Fig. 4 which represents diagrammatically the equivalent mechanical system to be described, in which F is the source of frequency and $m_1$ represents the effective mass and $s_1$ the effective stiffness of the diaphragm, e. g. the velocity of the diaphragm in free air is equal to:

$$\frac{\text{force}}{m\omega - \frac{s}{\omega}} \quad (1)$$

When the diaphragm is closed on one side by an air chamber of volume V, the chamber will impose an additional stiffness $s_2$ on the diaphragm equal to:

$$\frac{\gamma A^2 10^6}{V} \quad (2)$$

where $\gamma$ is the ratio of specific heats of air and A is the area of the diaphragm. The movement of the diaphragm will then be represented by the series circuit including diaphragm mass and stiffness $m_1$ and $s_1$ and the chamber stiffness $s_2$. Now, instead of a completely closed air space in the chamber under the diaphragm, suppose the air chamber is of infinitesimal size but provided with a small opening. Then the mechanical resistance of the air in the opening will be represented by $r$, and $m_2$ will be the mechanical reactance or mass of the opening. The resistance is defined as that part of the ratio of force to velocity in the opening which is in phase with the force and the mass reactance that part of this ratio which lags 90° behind the force. For instance, for a slit of width $w$, length $l$, and height $d$ $$r = \frac{12\mu w l}{d} \quad (3)$$

and $$m_2 = \rho l w d \quad (4)$$

where $\mu$ is the coefficient of viscosity and $\rho$ the density of air.

The resistance imposed by the slit on the diaphragm is $R = \frac{A^2}{a^2} r$, and the mass is $m_2 = m\frac{A^2}{a^2}$ where A is the area of the diaphragm and $a$ the area of the slit opening. We shall call R and $m_2$ the transformed resistance and transformed mass respectively of the opening. The stiffness and mass of the diaphragm in combination with the stiffness of the air chamber under the diaphragm will be the mass $m_1$ and stiffness $s_1$ and the stiffness $s_2$. However, when the narrow slit 44 is connected to the chamber under the diaphragm the operation of the diaphragm is represented by mass $m_1$, stiffness $s_1$, resistance R and mass $m_2$.

The mechanical impedance of the system shown in Fig. 4 is equal to:

$$\left\{\left[\frac{s_2^2 R}{\omega^2\left[R^2 + \left(m_2\omega - \frac{s_2}{\omega}\right)^2\right]}\right] + \left[\frac{\frac{s_2^2 m_2}{\omega} - \frac{s_2^2 R}{\omega} - \omega s_2 m_2^2}{R^2 + \left(m_2\omega - \frac{s_2}{\omega}\right)^2} + m_1\omega - \frac{s_1}{\omega}\right]^2\right\}^{1/2} \quad (5)$$

By proper choice of the constants in this expression the absolute value of the impedance may be made to vary with the frequency in substantially any desired manner. For certain acoustic devices such as electromagnetic and electrostatic receivers, electrostatic transmitters and carbon microphones, the impedance should vary inversely as the frequency. Then the impedance characteristic will be such as to impose a relatively high impedance at low frequencies and a relatively low impedance at high frequencies and the response or amplitude characteristic will therefore be uniform and level over a greater portion of the important speech frequency range. For an electrodynamic receiver as shown in the drawing in which the impedance varies inversely as the frequency, the diaphragm stiffness and mass should be approximately $$1/2\pi\sqrt{\frac{s_1}{m_1}} > 1500 \text{ cycles.}$$

The stiffness of the chamber under the diaphragm should be greater than twice the stiffness of the diaphragm $s_1$ and the resistance and mass of the restricted passageway or slit may be represented by $$\frac{R^2}{m_2} > 1/4 s_2.$$

These values may be derived from the expressions 2, 3 and 4 as follows:

$$\frac{R^2}{m_2} = \frac{\left(\frac{12\mu wl}{d}\right)^2 \left(\frac{A^2}{w^2 d^2}\right)^2}{\rho lwd \frac{A^2}{w^2 d^2}} > 1/4 \frac{\gamma A^2 \cdot 10^6}{V}$$

then $$\frac{R^2}{m^2} = \frac{12\mu^2 l}{wd^4 \rho} > 1/4 \frac{\gamma}{V} \cdot 10^6.$$

The electrodynamic receiver shown in Fig. 5 is similar in construction to the receiver shown in Figs. 1 and 2 except that the dome-shaped inner pole piece 50 is assembled on the central pole 51 of the magnetic shell casing 52. A guide ring 53 fits in a reduced portion of the central pole 51 and is held in position by the pole piece 50 which is fastened to the central pole 51 by the screw 54. The diaphragm assembly comprises the annular pole piece 55 which supports the diaphragm 56 on one surface in a manner similar to that described in connection with Figs. 1 and 2. The coil 57 is attached to the diaphragm and is suspended in the annular gap formed between the inner edge of the pole piece 55 and the outer edge of the dome-shaped central pole piece 50. A damping plate 58 having an aperture, the diameter of which is exactly the diameter of the guide ring 53 is attached to the annular pole piece 55 and spaced therefrom adjacent the annular gap by a spacing ring 59, of phosphor bronze, similar to the ring 27 described in Figs. 1 and 2. When the diaphragm assembly is mounted on the magnet shell, the damping plate 58 slips over the central pole piece 50 and the guide ring 53 and the outer edge of the annular pole piece 55 engages the rim of the casing 52. A ring clamping plate 60 having a threaded portion engages the threads of the casing and clamps the diaphragm assembly slightly beyond the edge of the dome-shaped portion. A receiver cap 61 is threaded to the clamping plate 60 and is provided with a funnel shaped opening through which the sound waves are emitted. A wire mesh screen guard 62 covers the funnel shaped opening adjacent the diaphragm 56 and has a curvature similar to the shape of the diaphragm.

The invention may also be applied with equal results to an electrodynamic transmitter as shown in Fig. 6 in which the mushroom-type shell casing 63 is similar to the casing employed in the receivers heretofore described. The diaphragm assembly of the transmitter differs from the diaphragm assembly of the receiver principally in the shape of the diaphragm and the area of the air chamber under the diaphragm. The radial distance between the movable coil 64 and the clamping ring 65 is greater in the transmitter diaphragm 66 than in the receiver and the diaphragm is of lighter mass than the receiver in order that the elasticity of the transmitter diaphragm may be low. The diaphragm 66 is also arch shaped as shown at 67 to eliminate resonance. Since only about one-half of the diaphragm area between the coil 64 and the clamping ring 65 is effective area and the diaphragm area within the coil 64 is all effective area, the air chamber under the diaphragm should be proportioned so that the chamber between the dome-shaped pole piece 68 and the dome-shaped portion of the diaphragm 66 within the coil is twice as deep as the chamber between the arch-shaped portion 67 of the diaphragm and the curved surface of the pole piece 69 outside of the coil, to secure equal compression or air chamber stiffness on the inside and outside of the movable coil 64. The air chamber under the diaphragm is substantially enclosed in the same manner as described in connection with Figs. 1 and 2 by the damping plate member 70 which is fastened to the central pole piece 68 and the outer pole piece 69 and provided with a spacing ring 71 having openings which form restricted radial slits 72 between the annular gap and the groove 73 in the damping plate. The plate 70 is also provided with equally spaced drilled holes 76 which communicate with the air space in the hollow portion of the casing 63.

In order to prevent sound entering the back of the diaphragm it is necessary to enclose the back of the transmitter. This may be accomplished in one respect by fitting the transmitter into a box 74. Enclosing the transmitter, however, imposes a stiffness on the diaphragm which adds to the stiffness of the chamber outside the coil. The enclosing box 74 is therefore made large enough so that the added stiffness is small compared to the chamber stiffness outside of the movable coil 64. The volume of air in the box 74 communicates with the hollow portion of the magnet casing 63 through distributed slits 75 in the casing.

While the impedance of the receiver varies inversely with frequency, the impedance of the transmitter should be constant with frequency, i. e., the transmitter should be a constant velocity device so that the diaphragm has a constant velocity for all frequencies for a constant pressure on the diaphragm. For a constant impedance the values of mass and stiffness of the diaphragm $s_1$ should be $$1/2\pi\sqrt{\frac{s_1}{m_1}} > 1000 \text{ cycles.}$$

Referring again to the diagrammatic view shown in Fig. 4, the values of transformed air chamber stiffness, $s_2$ should be such that $$1/2\frac{\sqrt{s_1+s_2}}{m_1} > 3000 \text{ cycles}$$

and the transformed acoustic resistance R of the restricted slit should be greater than $$1/2\sqrt{s_2 m_2}.$$

By controlling and damping the mechanical motion of the diaphragm of electrodynamic devices with the mass, viscosity and stiffness of the air in the chamber behind the diaphragm the response characteristics of these devices may be made uniform over a larger range of frequencies and the quality of reproduction increased.

The invention has been described in connection with magnetic structures in which the casing and pole pieces are permanently magnetized to produce a steady flux in the annular gap in which the movable coil is suspended. However, the invention may also be applied to the electromagnetic type of device with equally good results.

Figure 7:
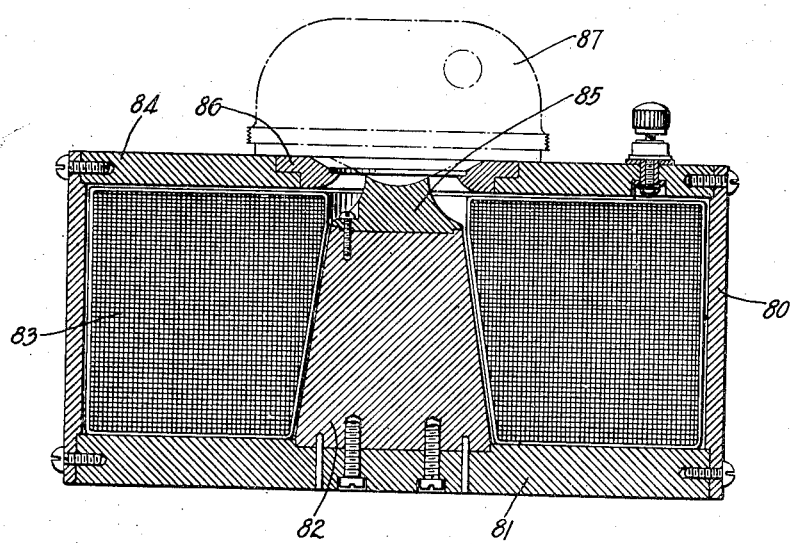
Fig. 7 shows in cross-section an electromagnetic structure for magnetizing the assembled electrodynamic devices in accordance with this invention.

When the magnetic elements of a device such as shown in Figs. 1, 2, 5 and 6 are magnetized prior to assembly, approximately 60% of the magnetic flux is lost when the pole pieces are separated from the casing to assemble the elements on the ring pole piece. In accordance with this invention the diaphragm assembly is placed on the shell casing and the unit is then magnetized by inverting and placing the unit on the electromagnetic magnetizing structure shown in Fig. 7. This structure comprises a cylindrical shell 80 which is closed at one end by a disc member 81 carrying a tapered central pole 82. A coil 83 is fitted within the casing and the casing is closed by an apertured circular pole piece 84 having the aperture co-axial with the central pole 82. A removable central pole piece 85 is attached to the central pole 82 and its surface is formed to correspond with the curvature of the diaphragm and pole piece of the transmitter or receiver 87 as shown in dotted line. The insert 86 which is supported on the pole piece 84 forms a seat for the annular pole piece of the transmitter or receiver which is to be magnetized. The transmitter or receiver is positioned on the magnetizing structure as shown on the dotted line and a heavy current is passed through the winding 83 to induce a high magnetic flux in the structure in contact with the pole pieces of the magnetizing structure. This arrangement forms an economical and efficient means of magnetizing the magnetic elements of the receiver or transmitter without sacrificing any of the flux in the structure since it is not necessary to remove any of the parts which make up the assembly. Furthermore, the diaphragm assembly is securely held on the casing by the cohesive force of the magnetic flux in the structure and maintains the diaphragm assembly on the casing without the use of screws or other attaching means.

What is claimed is:

1. An electrodynamic device comprising a diaphragm which is sufficiently rigid to vibrate as a whole, an annular coil attached to said diaphragm and suspended in an air gap between the poles of said device, and means forming a restricted chamber under said diaphragm, the acoustic impedance of the restricted chamber combined with the mechanical impedance of the diaphragm being such that the resultant impedance of the diaphragm is inversely proportional with frequency.

2. An electrodynamic device comprising a diaphragm operating as a piston and having small mass and stiffness, an air chamber in the rear of said diaphragm having an air stiffness greater than twice the stiffness of said diaphragm, and a restricted passageway leading from said chamber having a ratio of the square of transformed resistance to mass which is greater than one-fourth the stiffness of said chamber.

3. An electrodynamic device comprising a magnet having its poles arranged to form a relatively small air gap therebetween, a diaphragm, a movable coil attached to said diaphragm and suspended in said air gap, and means on one side of said diaphragm and coil forming an acoustic resistance path to control the motion of said diaphragm.

4. An electrodynamic device comprising a shell magnet having a central pole, an annular pole on said shell forming an annular gap with said central pole, a diaphragm supported on one side of said annular pole, an annular coil attached to said diaphragm and movable in said gap, and a plate on the other side of said ring pole forming a restricted passageway under said diaphragm leading into said shell magnet, to utilize the mass, elasticity and viscosity of the air to control the mechanical motion of said diaphragm.

5. An electrodynamic device comprising a magnetic structure having a small annular gap between the poles thereof, a piston type diaphragm carried by one of the poles and having an annular coil movable in said gap between the poles, said poles and diaphragm forming walls of a chamber under said diaphragm, and a plate substantially enclosing the space in said chamber, said plate having restricted passageways leading from said chamber.

6. An electrodynamic device comprising a diaphragm, means including a coil attached to said diaphragm for driving it, an air chamber on one side of said diaphragm, the average depth of said chamber behind that portion of the diaphragm within the area bounded by the coil being greater than the depth of the chamber behind the portion of the diaphragm without the area bounded by said coil.

7. An electrodynamic device comprising a diaphragm which is sufficiently rigid to vibrate as a whole, an annular coil attached to said diaphragm and suspended in an air gap between the poles of said device, and air damping means forming a restricted chamber under said diaphragm, the effective area of said chamber within said coil being greater than the area outside said coil, to secure equal air chamber stiffness on the inside and outside of the movable coil.

8. An acoustic device comprising a diaphragm having a coil movable in a gap between the poles of a magnetic structure, said coil comprising a plurality of turns of a ribbon conductor wound edgewise, said turns being insulated from each other and formed into a self-supporting coil, said coil being supported by said diaphragm solely by affixing one of the turns of said conductor to said diaphragm.

9. An electrodynamic device comprising a magnet, pole pieces engaging said magnet and forming an annular air-gap, one of said pole pieces having a dome-shaped surface, a diaphragm having a stiff central curved portion corresponding to the surface of said dome-shaped pole piece and spaced therefrom, the base of said curved portion being coaxial with said gap, and a coil rigidly fixed to said base and suspended in said gap.

10. In a constant impedance device, a diaphragm, the mass and stiffness of said diaphragm being such that the natural frequency of vibration of the diaphragm is less than 1,000 cycles, an air chamber in the rear of said diaphragm having a stiffness which when combined with the stiffness of the diaphragm increases the natural frequency of the diaphragm to more than 3,000 cycles, and a restricted opening leading from said chamber, said opening adding an auxiliary mass to said diaphragm and a resistance which is greater than one half the square root of the chamber stiffness and the mass of the restricted opening.

11. An electrodynamic device comprising a hollow shell magnet having a central pole, a dome-shaped pole piece on said pole, an annular pole surrounding said central pole piece but spaced therefrom to form an annular gap between said poles, a diaphragm attached to one surface of said annular pole piece and having a portion corresponding in shape to said dome-shaped pole piece and equally spaced therefrom over the whole area of said pole piece, an annular coil attached to said diaphragm and movable in said annular gap between said pole pieces, said pole pieces and diaphragm forming walls of an air chamber for adding stiffness to the diaphragm, and an annular plate surrounding said central pole and substantially closing the air chamber formed by said poles and diaphragm.

12. An electrodynamic device comprising a hollow shell magnet having a central pole, a dome-shaped pole piece on said pole, an annular pole piece surrounding said dome-shaped pole piece but spaced therefrom to form an annular gap between said pole pieces, a diaphragm attached to one surface of said annular pole piece, and having a portion corresponding in shape to said dome-shaped pole piece and equally spaced therefrom over the whole area of said pole piece, an annular coil attached to said diaphragm and movable in said annular gap between said pole pieces, said pole pieces and diaphragm forming walls of an air chamber for adding stiffness to the diaphragm, and an annular plate surrounding said central pole and substantially closing the air chamber formed by said poles and diaphragm, said plate having an annular groove out of alignment with said annular gap between said poles and narrow passageways communicating with said gap and annular groove.

13. An electrodynamic device comprising a hollow shell magnet having a central pole, a pole piece on said pole, an annular pole piece surrounding said central pole piece but spaced therefrom to form an annular gap between said pole pieces, a diaphragm attached to one surface of said annular pole piece and having a portion corresponding in shape to a face of said central pole piece and equally spaced therefrom over the whole area of said pole piece, an annular coil attached to said diaphragm and movable in said annular gap between said pole pieces, said pole pieces and diaphragm forming walls of an air chamber for adding stiffness to the diaphragm, an annular plate having an annular groove surrounding said central pole and substantially closing the air chamber formed by said poles and diaphragm, and a spacing member between said poles and annular plate, said member having cut out portions forming radial slits between the surfaces of said annular pole piece and annular plate and between said annular gap and annular groove.

14. An electrodynamic device comprising a hollow shell magnet having a central pole, a pole piece therefor, an annular pole piece surrounding said central pole piece but spaced therefrom to form an annular gap between said pole pieces, a diaphragm attached to one surface of said annular pole piece and having a portion corresponding in shape to a face of said central pole piece and equally spaced therefrom over the whole area of said pole piece, an annular coil attached to said diaphragm and movable in said annular gap between said pole pieces, said pole pieces and diaphragm forming walls of an air chamber for adding stiffness to the diaphragm, and an annular plate surrounding said central pole and substantially closing the air chamber formed by said pole pieces and diaphragm, said plate having an annular groove out of alignment with said annular gap between said pole pieces and narrow passageways communicating with said gap and annular groove, said plate having distributed openings in alignment with and at right angles to said annular groove, said openings forming communicating passageways between the hollow shell of said magnet and the chamber under the diaphragm.

15. An electrodynamic device comprising a magnetic shell casing having a central pole, a diaphragm assembly comprising an annular pole piece, a central pole piece within said annular pole piece and forming an annular gap therebetween, said annular pole piece and central pole piece having their surfaces in the same plane to engage the rim of said casing and central pole respectively, and an air damping plate on one side of said pole pieces, said plate slidably surrounding said central pole, a diaphragm positioned on the opposite side of said annular pole piece and central pole piece, said diaphragm supporting an annular coil freely in said annular gap between the pole pieces, said assembly being maintained in position with respect to said shell casing by magnetic force.

16. An electrodynamic device comprising a cobalt steel magnetic shell having a central pole, an annular pole piece engaging said shell, a pole piece engaging said central pole and forming an annular gap coaxial with said annular pole piece, a non-magnetic diaphragm on one side of said annular pole piece, a coil attached to said diaphragm and suspended in said annular gap, and a non-magnetic damping ring on the other side of said annular pole piece and central pole piece, said damping ring engaging said central pole of said casing.

17. The method of assembling an electrodynamic device comprising a shell casing, a central pole, an annular pole, a diaphragm and coil on said diaphragm, which comprises assembling the diaphragm and coil on said annular pole, positioning said annular pole on said casing, and magnetizing said poles and casing after assembly.

18. In combination, a cup-shaped magnet, having a central pole, pole pieces for said magnet forming an annular magnetic gap, a diaphragm, a coil positioned in said gap and connected to said diaphragm for driving it, and an air chamber behind said diaphragm having a small outlet so as to stiffen the diaphragm when it is actuated.

19. In combination, a magnet, pole pieces therefor, a diaphragm, a coil connected to said diaphragm for driving it, a plate behind said diaphragm, said pole pieces, and plate cooperating to form an air chamber of small volume on one side of the diaphragm, said plate having small holes therein to permit the passage of air therethrough from and to said chamber.

20. A magnetic device comprising a casing having a central pole, and an annular pole piece surrounding said central pole and maintained in contact with said casing by magnetic attraction.

21. An electrodynamic device comprising a casing having a central pole, an annular pole piece surrounding said annular pole and forming an annular gap between said pole and pole piece, a diaphragm attached to said pole piece, and a coil mounted by said diaphragm located in said annular gap, said pole piece diaphragm and coil being supported substantially by the magnetic attraction between said pole piece and casing.

22. The method of assembling an electrodynamic device comprising a shell casing, a central pole, an annular pole, a diaphragm and a coil on said diaphragm, which comprises assembling the diaphragm and coil on said annular pole, positioning said annular pole on said casing, inverting the assembly on a magnetizing structure, and sending a magnetizing current through said assembly.

In witness whereof, I hereunto subscribe my name this 5th day of May, 1928.

EDWARD C. WENTE.